US008442962B2

(12) United States Patent
Lee et al.

(10) Patent No.: US 8,442,962 B2
(45) Date of Patent: May 14, 2013

(54) DISTRIBUTED TRANSACTION MANAGEMENT USING TWO-PHASE COMMIT OPTIMIZATION

(75) Inventors: Juchang Lee, Seoul (KR); Michael Muehle, Walldorf (DE)

(73) Assignee: SAP AG, Walldorf (DE)

( * ) Notice: Subject to any disclaimer, the term of this patent is extended or adjusted under 35 U.S.C. 154(b) by 141 days.

(21) Appl. No.: 12/980,178

(22) Filed: Dec. 28, 2010

(65) Prior Publication Data

US 2012/0166407 A1    Jun. 28, 2012

(51) Int. Cl.
*G06F 7/00* (2006.01)
*G06F 17/30* (2006.01)

(52) U.S. Cl.
USPC ............. 707/703; 707/611; 707/713; 714/16; 714/20

(58) Field of Classification Search ................... 707/703, 707/611, 713; 714/16, 20
See application file for complete search history.

(56) References Cited

U.S. PATENT DOCUMENTS

| | | | | |
|---|---|---|---|---|
| 5,258,982 A | * | 11/1993 | Britton et al. | .................. 370/408 |
| 5,734,897 A | * | 3/1998 | Banks | ................................... 1/1 |
| 5,835,757 A | * | 11/1998 | Oulid-Aissa et al. | .................. 1/1 |
| 2008/0172584 A1 | * | 7/2008 | Meller et al. | ................... 714/702 |
| 2008/0250074 A1 | * | 10/2008 | Parkinson | ..................... 707/200 |
| 2008/0301199 A1 | * | 12/2008 | Bockhold et al. | .............. 707/202 |
| 2009/0157766 A1 | * | 6/2009 | Shen et al. | ...................... 707/202 |
| 2010/0145801 A1 | * | 6/2010 | Chekuri | ...................... 705/14.51 |
| 2010/0185921 A1 | * | 7/2010 | Meller et al. | ................... 714/763 |

* cited by examiner

*Primary Examiner* — Shew-Fen Lin
(74) *Attorney, Agent, or Firm* — Mintz Levin Cohn Ferris Glovsky and Popeo, P.C.

(57) ABSTRACT

A computer-implemented method, a computer-readable medium and a system are provided. A transaction master for each of a plurality of transactions of a database is provided. Each transaction master is configured to communicate with at least one transaction slave to manage execution of a transaction in the plurality of transactions. Each transaction master configured to perform generating a transaction token to specify data to be visible for a transaction on the database, the transaction token including a transaction identifier for identifying whether the transaction is a committed transaction or an uncommitted transaction, receiving a request to commit the transaction, initiating, based on the request, a two-phase commit operation to commit the transaction. The two-phase commit operation includes preparing for committing the transaction, writing a committed transaction to a memory, optimizing the two-phase commit operation by omitting a phase of the two-phase commit operation, generating an acknowledgement of the committed transaction. The plurality of transactions of the database are executed with each transaction master.

16 Claims, 9 Drawing Sheets

DISTRIBUTED TRANSACTION MANAGEMENT USING TWO-PHASE COMMIT OPTIMIZATION

TECHNICAL FIELD

The subject matter described herein relates to data processing and in particular, to distributed transaction management using two-phase commit optimization.

BACKGROUND

In the past, database management systems were designed for optimizing performance on hardware with limited amounts of main memory and with the slow disk access, both of which served as bottlenecks. The focus was thus on optimizing disk access, for example, by minimizing the number of disk pages to be read in to main memory, when processing a query.

Today, computer architectures have, however, changed. Using multi-core central processing units ("CPUs"), parallel processing may be possible with fast communication between processor cores (via main memory or shared cache). Main memory is no longer a limited resource. Modern computer architectures create new possibilities but also new challenges. With most, if not all, relevant data stored in memory, disk access is no longer a limiting factor for performance. With the increasing number of processing cores, CPUs will be able to process more and more data per unit interval of time.

Conventional database transactions occur between a transactional engine and a database, in which the transactional engine queries the database to create, retrieve, update, delete, insert, and the like data (e.g., a record) at the database. However, problems may occur when database transactions become distributed, i.e., when two transactional engines are used or when the transaction runs on more than one physical instance. These problems may include difficulty in identifying committed and uncommitted transactions, which are in progress. For example, even though two transactions are executed in parallel, a later, second transaction may need to know which of the records have been committed in an earlier transaction to ensure that the correct data is being used.

SUMMARY

In some implementations, a computer-implemented method includes providing a transaction master for each of a plurality of transactions of a database. The transaction master is configured to communicate with at least one transaction slave to manage execution of a transaction in the plurality of transactions. The transaction master configured to perform operations including generating a transaction token to specify data to be visible for a transaction on the database, the transaction token including a transaction identifier for identifying whether the transaction is a committed transaction or an uncommitted transaction, receiving a request to commit the transaction, initiating, based on the request, a two-phase commit operation to commit the transaction. The two-phase commit operation includes preparing for committing the transaction, writing a committed transaction to a memory, optimizing the two-phase commit operation by omitting a phase of the two-phase commit operation, generating an acknowledgement of the committed transaction. The plurality of transactions of the database are executed with each transaction master.

In some variations, one or more of the following may be optionally included. The generating the acknowledgement includes generating an early acknowledgement of the committed transaction. The early acknowledgement of the committed transaction is generated together with the writing of the committed transaction to the memory. The optimizing the two-phase commit operation includes omitting the writing of the committed transaction to the memory. The omitting the writing of the committed transaction includes determining a log sequence number corresponding to the transaction, comparing the log sequence number corresponding to the transaction to a log sequence number stored on the at least one transaction slave, and generating, based on the comparison, a request to the transaction master to determine whether to commit a transaction that is not committed. The optimizing the two-phase commit operation includes omitting the preparing for committing the transaction. The omitting the preparing for committing the transaction includes receiving a log sequence number corresponding to the transaction together with the request to commit the transaction, determining, at the transaction master, a stored log sequence number corresponding to the at least one transaction slave, comparing the received log sequence number and the stored log sequence number, and determining, based on the comparing, whether to omit the preparing for committing the transaction. The method can optionally include obtaining the transaction token corresponding to the committed transaction based on a commit identifier corresponding to the transaction.

Articles are also described that comprise a tangibly embodied computer-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
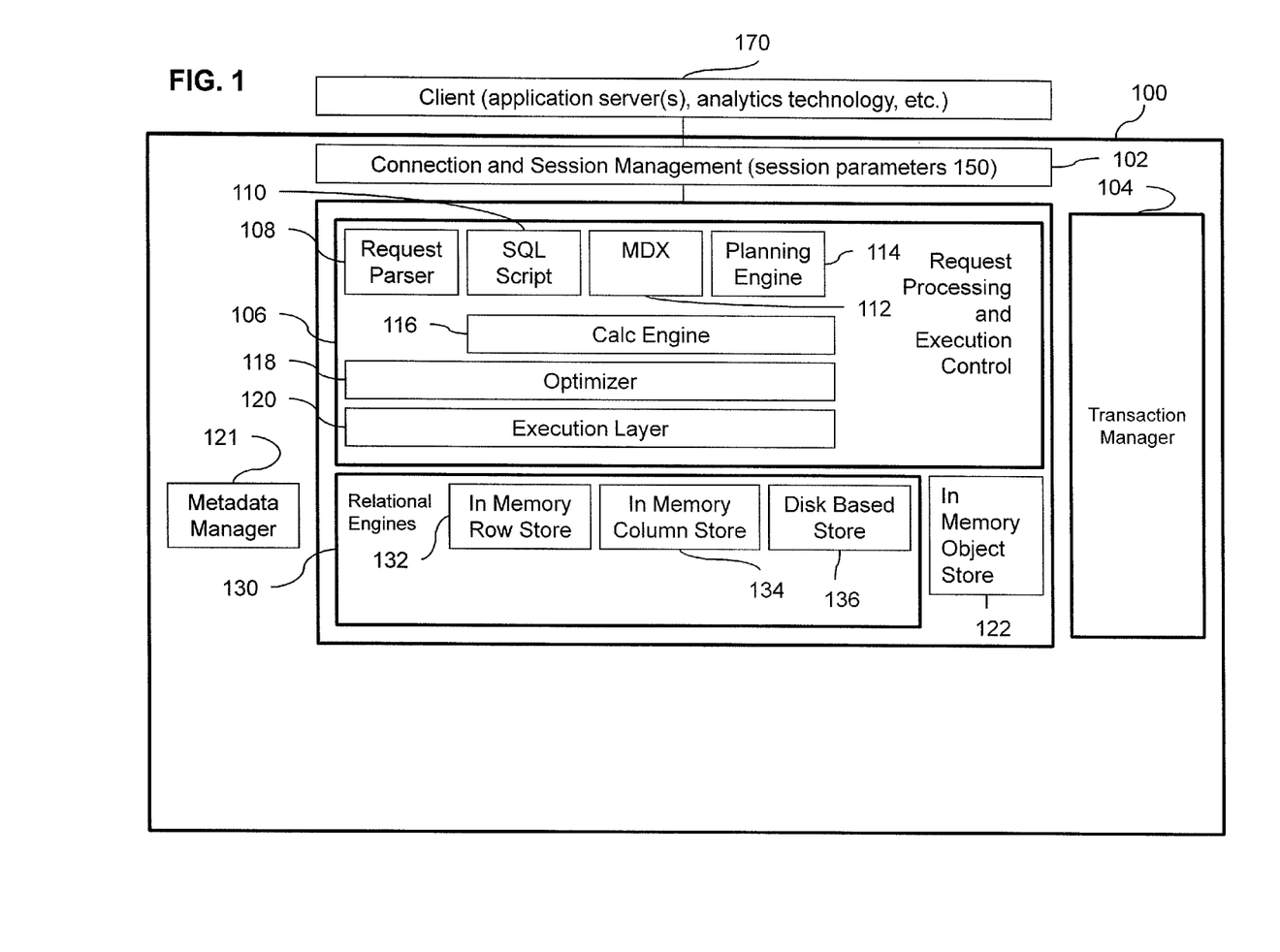
FIG. 1 illustrates an exemplary system for managing transactions in a distributed processing system, according to some implementations of the current subject matter.

FIG. 1 illustrates an exemplary database processing system 100, according to some implementations of the current subject matter. In some implementations, client 170 (e.g., an application server, analytics application, and/or any other client application accessing system 100) may communicate with system 100 to process various transactions. The system 100 may include connection and session management component 102, request processing and execution control components layer 106, relational engines 130, transaction manager 104, and a metadata manager component 121.

The connection and session management component 102 may create and manage sessions and connections for database clients 170. For each session, a set of session parameters 150 may be maintained, such as auto-commit settings and/or a current transaction isolation level. Once a session is established, a database client 170 may use structured query language ("SQL") statements to communicate with the system 100.

In some implementations of system 100, each statement may be processed in a context of a transaction. New sessions may be implicitly assigned to a new transaction. For such purposes, the transaction manager 104 may coordinate the transactions of system 100, control transactional isolation, and keep track of any running and/or closed transactions. When a transaction is committed or aborted ("rolled back"), the transaction manager 104 may inform any involved elements of system 100 about the commit or abort. When a transaction is committed, recoverable, durable resources are placed in their final states. When transaction is aborted, recoverable resources are placed in their initial states.

Client 170 may send a request, which is analyzed and executed by the request processing and execution control components layer 106. The components in the request processing and execution control components layer 106 may include a request parser component 108, an SQL script component 110 for handling SQL statements including script, a multidimensional expression (MDX) component 112 for handling MDX queries, a planning engine 114 for built-in support of domain-specific models (e.g., for financial planning), a calculation engine 116 for generating an execution plan based on queries/statements received from 108, 110, 112, and 114, an optimizer component 118, and an execution layer 120.

The request parser 108 may be configured to analyze a client request and dispatch the request to responsible elements within system 100. For example, transaction control statements may be forwarded to the transaction manager 104, data definition statements may be dispatched to the metadata manager component 121, and object invocations may be forwarded to a memory object store 122. Data manipulation statements may be forwarded to the optimizer 118, which may create an optimized query execution plan that may be provided to the execution layer 120.

The execution layer 120 may act as the controller that receives a query execution plan and invokes relational database engines, routing any intermediate results to temporary storage or another execution operation.

The metadata manager component 121 may be configured to access metadata having a variety of objects. Examples of such metadata may include definitions of relational tables, columns, views, and indexes, definitions of SQL script functions, and object store metadata. Metadata of all these types may be stored in one common catalog for all system 100 stores (e.g., in-memory row store 132, in-memory column store 134, object store 122, disk based 136). System 100's metadata may be stored in tables in a row store, although other formats may be used as well. The metadata manager 121 may be configured to provide transaction support, multiversion concurrency control, and other functionalities.

The relational database engines (labeled "relational engines") 130 may be configured to include various relational database engines, such as an in-memory row store 132, an in-memory column store 134, a disk-based store 136 and in-memory object store 122. The phrase "in-memory" refers to storing most, if not all, of the relevant data of a database in memory, such as random access memory, dynamic access memory, and the like rather than store the relevant data in slower, persistent storage mechanisms, such as an electromechanical disk drive or an optical storage device. The row store engine 132 may be configured to store data in a row-based manner, providing thus a row-store database. The column store engine 134 may be configured to store data in column-based manner, providing thus a column-store database.

In some implementations, disk-based store 136 may be configured as well to provide a persistent database and to handle persistent database operations not handled in memory row store and column store 132 and 134. Data in persistent disk-based store 136 may be primarily stored on a disk drive.

The object store 122 may also be an in-memory database storing graph-like structures in memory. These graph structures may be represented by networks of objects and may be used for optimization and planning tasks that operate on large volumes of graph-like data, for example, in supply chain management.

In some implementations, isolation of concurrent transactions may be a requirement for correct execution of transactions. Without transactional isolation, it is possible that concurrent transactions may read an inconsistent, intermediate state written by some transactions or a state caused by a transaction that is later aborted (a "dirty read"). The system 100 may include a multiversion concurrency control ("MVCC") that may ensure consistent read operations among the relational database engines 130 and/or among systems 100. With multiversion concurrency control, concurrent read operations may have a consistent view of the database without blocking concurrent write operations. This approach may be configured to provide a higher degree of concurrency compared to concurrency control based on shared read-locks. With multiversion concurrency control, updates may be implemented not by overwriting existing records but by inserting new versions. A transaction may write a new version of some data item while concurrent transactions still have a read-access to previous versions. A timestamp (or equivalent mechanism) may be associated with each version. This information may be used to determine which versions are visible for which transactions. Deletions may be implemented by inserting a deletion version or by some other mechanism that indicates that the previous version is no longer visible to subsequent transactions.

MVCC may be used to implement different transaction isolation levels. The system 100 may be configured to support transaction level snapshot isolation and statement level snapshot isolation. With transaction level snapshot isolation, all statements of a transaction may see the same snapshot of a database. This snapshot may contain all changes that were committed at the time the transaction started (plus the changes made by the transaction itself). This form of snapshot isolation may be implemented using SQL isolation level "repeatable read." With statement level snapshot isolation, different statements in a transaction may see different snapshots of the data in the database. Specifically, each statement may see changes that were committed when the execution of the statement started. This isolation level may correspond to SQL transaction isolation level "read committed."

To keep track of transactions and to implement timestamps for multiversion concurrency control, a transaction manager, such as transaction manager 104, may maintain two sequences of identifiers: a transaction identifier and a commit identifier. The transaction identifier ("TID") may be an integer number representing a sequence of starting points of write transactions. The TID may be increased when a write transaction starts or when a read transaction is transformed into a write transaction. Transactions processed by the system 100 may be read transactions or write transactions. A transaction may start as a read transaction but it may be promoted to a write transaction using the transaction manager 104. The TID may be assigned to the write transaction as its unique identifier. The TID may be used to store a transaction that made an uncommitted change. The commit identifier ("CID") may be an integer number reflecting a commit sequence of write transactions. The transaction manager 104 may internally keep a maximum commit identifier, which may be a sequence number of a most recent commit. When a transaction is committed, the maximum commit identifier may be increased and a new value may be assigned to the committed transaction. The CID may be equivalent to a commit timestamp. The transaction manager 104 may maintain a table that may map CID integer numbers to the actual timestamps.

To provide the consistent view for a transaction or a statement, the system 100's engines (e.g., row store, column store, object store engines, and the like) may be configured to require different information about the state of other transactions at the time of the transaction/statement is started to determine the consistent view. For example, the row store engine 132 may be configured to use CIDs, and the column store engine 134 may be configured to use logic based on transaction start sequence numbers, i.e., TIDs. A transaction token may be configured to include all the information needed to construct a consistent view of a transaction. It may be passed as additional context information to operations and/or engines that may be involved in the processing of a transaction or execution of a statement.

The transaction manager 104 may be configured to maintain a central transaction token. When a read transaction is started, a copy of the central transaction token may be assigned to that transaction. The central token may be updated whenever a relevant event occurs (such a start or an end of a write transaction). Multiple read transactions started consecutively may get copies of the same transaction token. As the transaction token also contains a unique TID of a write transaction, each of the write transactions may have different transaction tokens.

Figure 2:
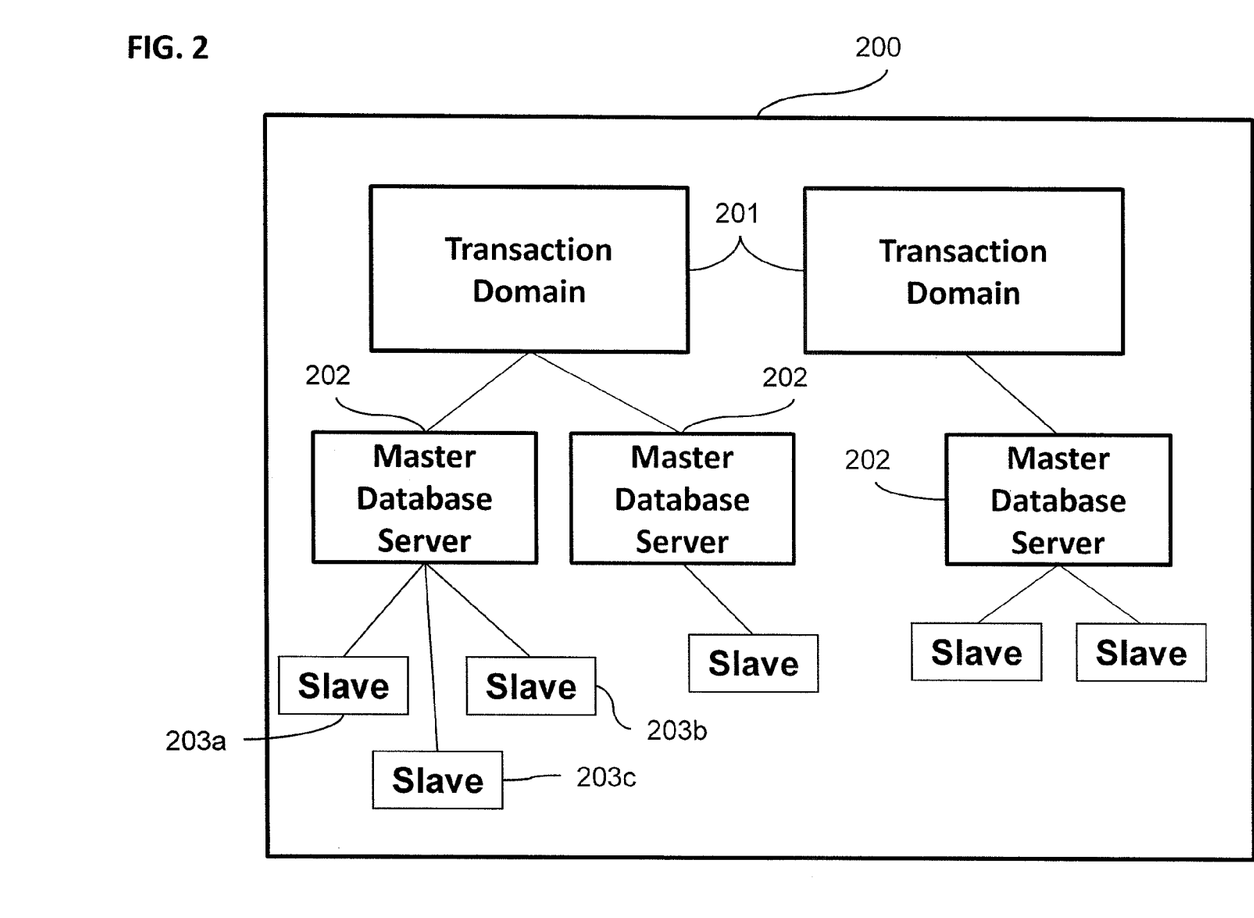
FIG. 2 illustrates an exemplary master-slave transaction management in a distributed processing system, according to some implementations of the current subject matter.

FIG. 2 illustrates an exemplary distributed database system 200, according to some implementations of the current subject matter. The system 200 may include at least one database server 202 that includes all components of system 100 shown and discussed in connection with FIG. 1 above. The database server 202 may include a separate operating system process and include its own disk volume(s). The database server 202 of the system 200 may be distributed across multiple hosts, although multiple database servers 202 may be executed in one host as well. During processing of database operations, database servers 202 may forward execution of some operations to other database servers that own data involved in the operation.

To ensure transactional consistency in the distributed implementation depicted at FIG. 2, the system 100 may be configured to support distributed transactions. The system 100 may have multiple transaction domains 201 to which the database servers 202 of the system 100 may be uniquely assigned. Distributed transactions may span only database servers 202 within the same transaction domain 201. In a transaction domain 201, there may be one database server 202 that may have a role of a transaction master, while other database servers may act as transaction slaves 203 (a, b, c). In a transaction domain, the transaction tokens may be centrally managed by the transaction master. The transaction master may be configured to maintain a list of open transactions and increase the timestamp sequences, such as, transaction ID and commit ID. The transaction master may also coordinate distributed commit operations, as shown in FIG. 3.

Figure 3:
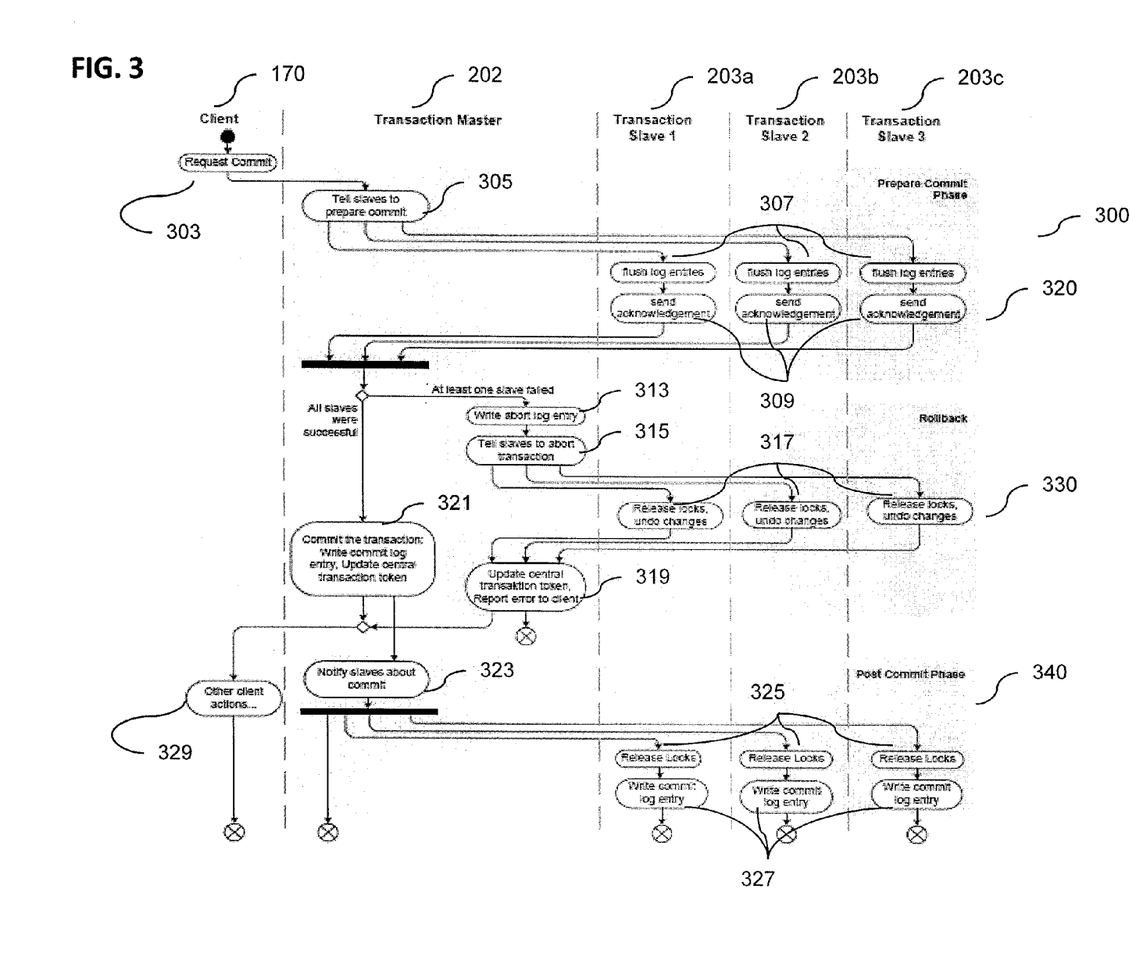
FIG. 3 illustrates an exemplary process for managing transactions, according to some implementations of the current subject matter.

FIG. 3 illustrates an exemplary process flow 300 for committing a transaction that may be handled by a transaction master, which may be one of the master database servers 202 shown in FIG. 2. To commit a transaction, the transaction master 202 may be configured to interact with transaction slaves 203 (a, b, c). A request 303 to commit a transaction may be generated by the client 170 and received by the system 100 (shown in FIG. 1). In some implementations, the transaction master 202 may include or otherwise be implemented as transaction manager 104 and the transaction slaves 203 (a, b, c) may be implemented as other database servers.

The system 300 may be configured to operate in three phases: prepare commit phase 320, rollback phase 330, and post commit phase 340. The client 170 may be configured to initiate a commit request 303 and forward it to the transaction master 202, thereby initiating the prepare commit phase 320. The transaction master 202 may then instruct the slaves 203 to prepare commit transaction. Each slave 203 may flush log entries (at 307) and generate an acknowledgement receipt (at 309) to the transaction master 202, thereby ending the prepare commit phase 320. At this point, the rollback phase 330 may be initiated. If all slaves 203 were successful during the prepare commit phase 320, the transaction is committed and a commit write log entry is written along with an update to a transaction token corresponding to the transaction. The client 170 may be informed of the commit by the transaction master 202 generating an acknowledgement, at which point the client 170 may proceed with its other actions (at 329). The acknowledgement may be forwarded to the client during the post commit phase 340. The transaction master 202 may also notify (at 323) the slaves 203 about sending an acknowledgement to the client 170. Then, the slaves 203 may release any locks 325 and create write commit log entries 327. The slaves may perform these operations during the post commit phase 340.

If during the prepare commit phase 320, one of the slaves 203 has failed, then a write abort log entry 313 may be created by the transaction mater 202, and the transaction master 202 informs slaves to abort the transaction (at 315). The slaves 203 may release any locks and undo changes made to any data (at 317). The transaction master 202 may then generate an error report to the client and update central transaction token corresponding to the transaction (at 319).

In some implementations, the system 300 may be configured to implement a two-phase commit operation that may operate as follows. When a commit is requested by an application, the central transaction master 203 may instruct all involved transaction slaves to prepare a commit operation, as shown in FIG. 3. The transaction slaves 203 (a, b, c) may prepare the commit operation by ensuring that log queue entries are flushed to disk. After this is successfully completed, the transaction slaves may send an acknowledgement back to the transaction master. When all transactions slaves 203 (a, b, c) have acknowledged successful commit preparation, the transaction master 202 may complete the commit operation by writing the commit log entry and updating the central transaction token. At this point, the transaction may be committed. In case of a crash, it may be redone from the logs and with the update of the central transaction token, the changes may be visible to other transactions. A positive result may be returned to the client that called the commit operation.

In the post commit phase, the transaction master may send asynchronous commit notifications to the transaction slaves. The transaction slaves 203 (a, b, c) may release the locks held for this transaction and write commit entries to their logs. Writing commit entries to the log of the transaction slaves may be an optimization to reduce startup time. During restart, these local commit entries may allow the transaction slaves to detect locally that a transaction was committed. If the local commit entry is missing during startup (e.g., because the slave crashed before it was written), the slave may ask the transaction master whether the transaction was committed or not.

If prepare commit fails for at least one of the transaction slaves, the transaction master may decide to rollback the transaction (phase 330 of FIG. 3). To execute a rollback, the transaction master may first write the rollback record to the log. This ensures that the transaction may be rolled back if the system crashes before the next save point. Then, the transaction master may send abort requests to the involved transaction slaves. The transaction slaves may perform a local rollback by releasing all locks and ensuring that the changes done as part of the transaction are not visible anymore. Then, they may send an acknowledgement to the transaction master. After all transaction slaves have acknowledged the rollback, the transaction manager may mark the transaction as closed in the central transaction token.

Figure 4:
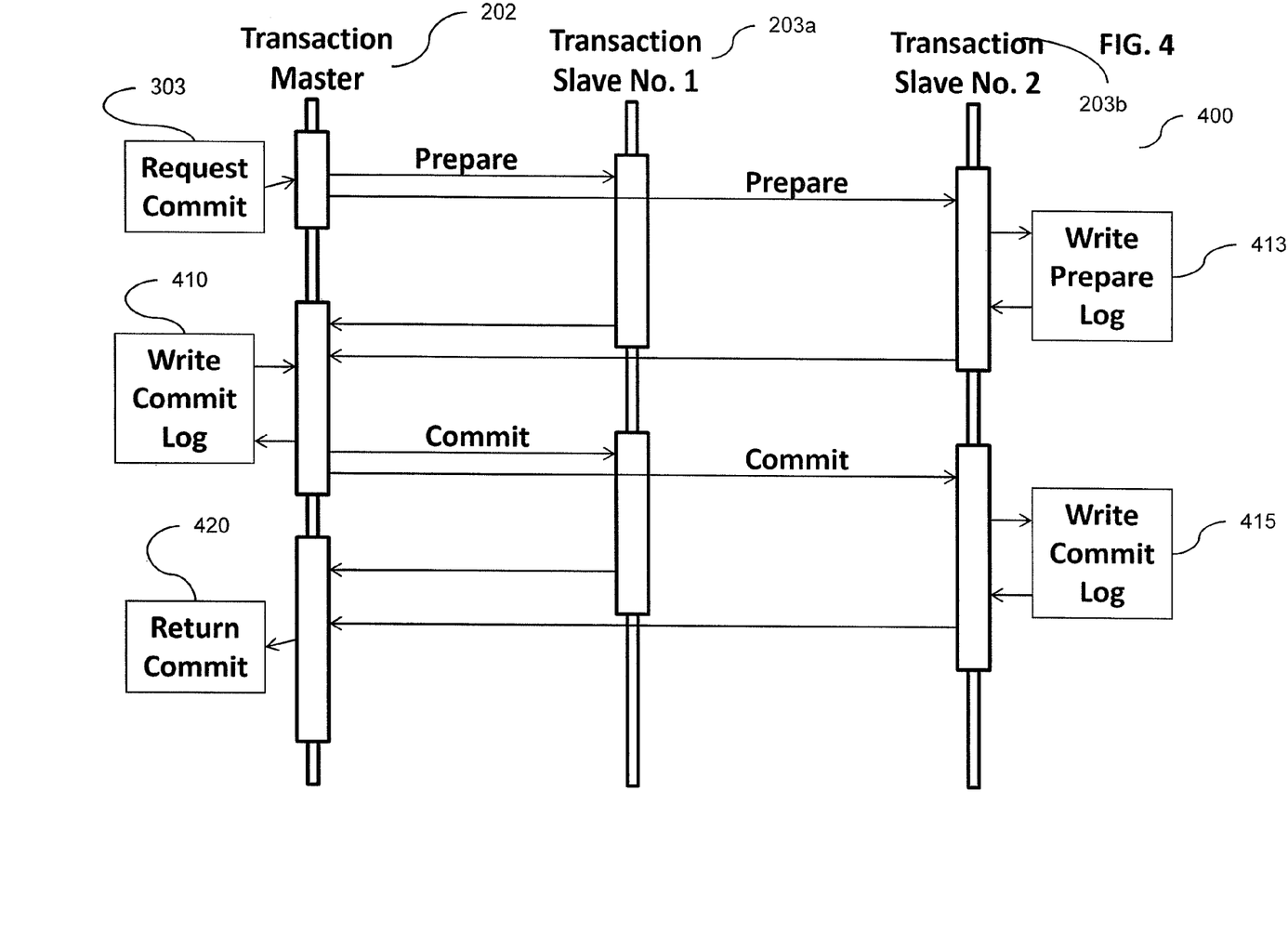
FIG. 4 illustrates an exemplary system for optimizing transaction management in distributed processing systems during a two-phase commit operation, according to some implementations of the current subject matter.

FIG. 4 illustrates an exemplary two-phase commit procedure 400 handled by a transaction master 202 and two transaction slaves 203 (a, b). As stated above, a two-phase commit is a commit protocol that may be used to ensure atomicity of distributed transactions. A request 303 to commit a transaction is received from a client 170 (not shown in FIG. 4) by the transaction master 202, which may instruct transaction slaves 203(a, b) to prepare for a commit operation. As a result, a write prepare log 413 is created. Then, the transaction master 202 may complete the commit operation by writing the commit log entry 410 and may update a central transaction token, thereby completing a first phase of the procedure 400. At this point, the transaction is committed. Once the transaction slaves have acknowledged a write commit operation by creating a write commit log entry 415, the transaction master 202 returns a commit acknowledgement 420, thereby completing a second phase of the procedure 400. The commit operation may involve two synchronous network interactions and three synchronous log input/output operations ("I/Os").

Figure 5:
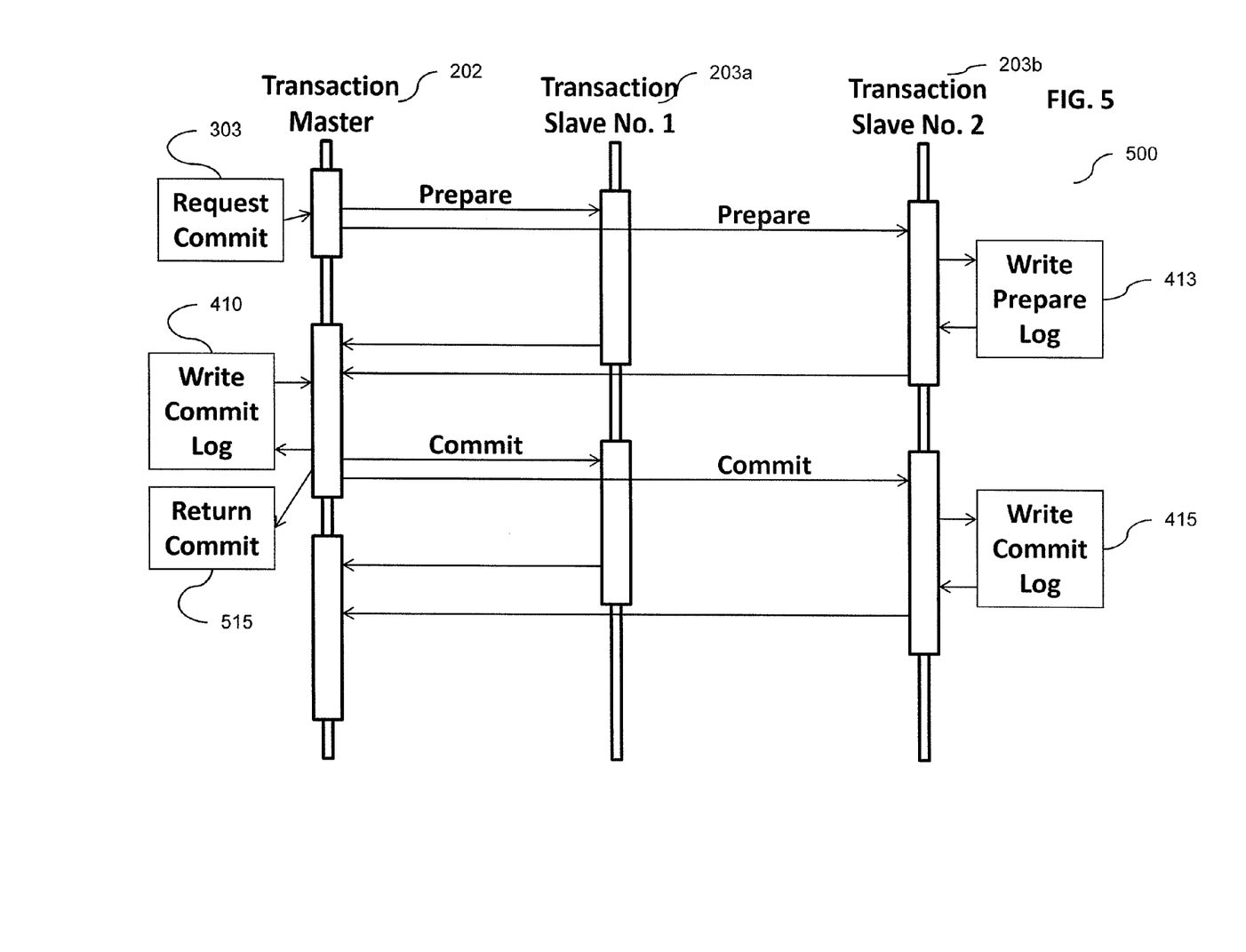
FIG. 5 illustrates an exemplary system for optimizing transaction management in distributed processing systems during a two-phase commit operation with an early commit acknowledgement, according to some implementations of the current subject matter.

FIG. 5 illustrates another exemplary two-phase commit procedure 500 handled by the transaction master 202 and transaction slaves 203 (a, b) during which an early commit acknowledgement is generated after the first commit phase, according to some implementations of the current subject matter. During procedure 500, the transaction master 202 may receive a request to commit transaction 303 and may appropriately instruct the transaction slaves 203(a, b) to process the request. As a result, a write prepare log entry 413 is created. Like FIG. 4, in the first phase, the transaction master 202 creates a write commit log entry 410. However, during the procedure 500, the transaction master 202 also generates an early commit acknowledgement 515 prior to entry into the second phase of the two-phase commit operation 500.

In multiversion concurrency control schemes that include a list of open transactions ("an open-TID list"), the second commit phase may be configured to write the commit log entry at the transaction slaves 203 to cache an up-to-date transaction token at the transaction slaves 203, and to release any acquired locks by the transaction. In some implementations, writing a commit log entry at the transaction slaves 203 may be done asynchronously. Then, during a crash recovery, some committed transactions may be classified as "in-doubt" transactions; however, because such transactions are marked as committed by the transaction master 202, the transactions do not prevent further crash recovery.

Figure 6:
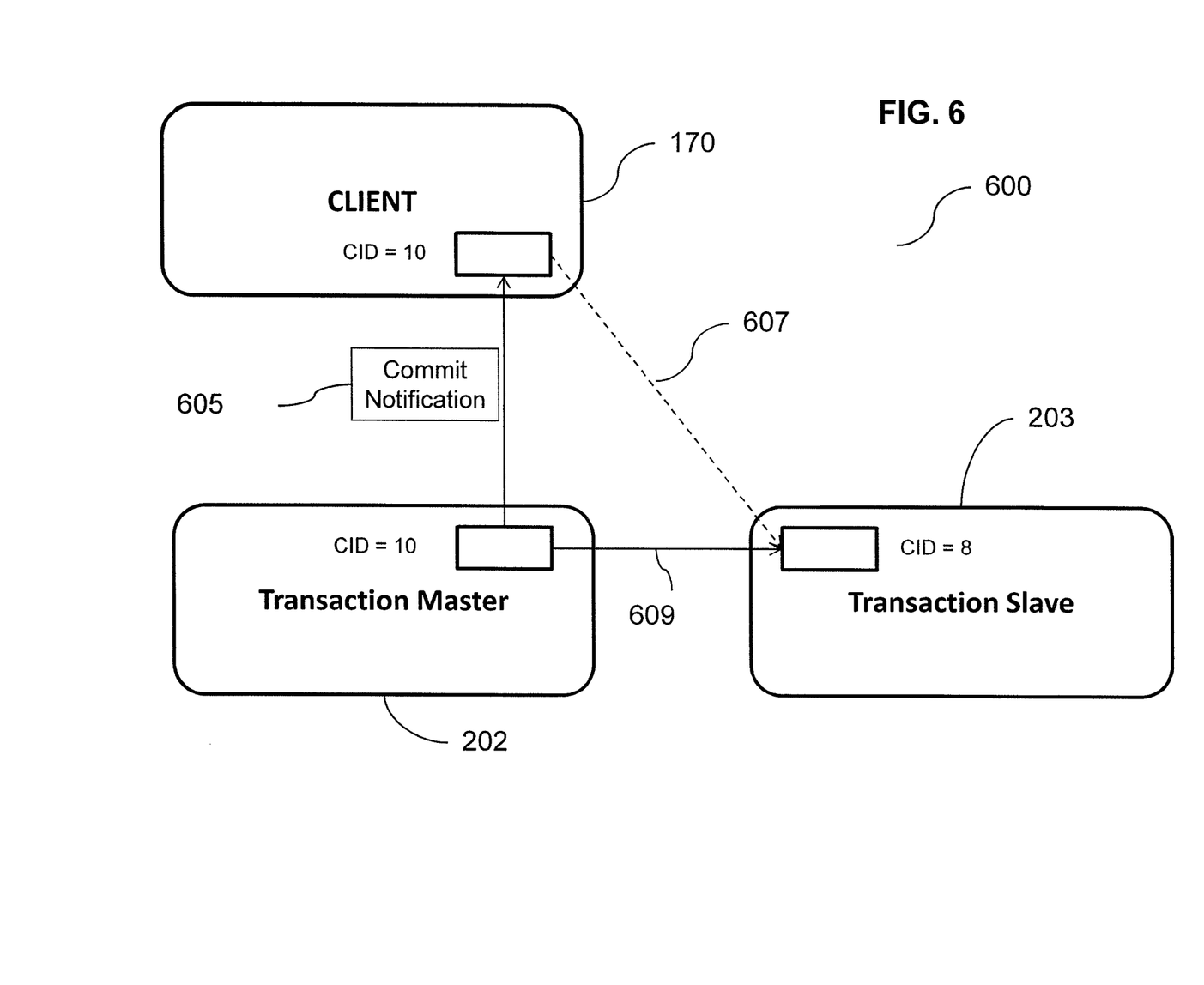
FIG. 6 illustrates an exemplary system for optimizing transaction management in distributed processing systems during a two-phase commit operation, according to some implementations of the current subject matter.

If transaction token caching at a transaction slave 203 is performed asynchronously, data may be visible by a transaction but not by the next (local) transaction in the same session. This situation may be detected by storing the last commit-notified CID for each session at the client side ("session-last-CID"), as shown in FIG. 6. A system 600, shown in FIG. 6, may include a client 170, a transaction master 202, and a transaction slave 203. The transaction master 202 may be configured to forward a commit acknowledgement or notification 605 of a transaction to the client 170. The last commit CID is stored by the client 170, which is the same as the commit CID stored at the transaction master 202. The master transaction token may be obtained by the client 170 from the transaction slave 203 if session-last-CID is less than the transaction slave's last-CID. By way of an example shown in FIG. 6, client's session-last-CID is 10 and the transaction slave's CID is 8. If the session-last-CID is larger than the transaction slave's last-CID of the target transaction slave 203, the transaction/statement may be upgraded into global transaction/statement to assign the master's transaction token to it.

If transactional locks are released after sending commit acknowledgement to the client 170, a "false lock conflict" may arise by the next transaction within the same session. If this is detected, the transaction may wait for a short time period until the commit notification arrives at the transaction slave 203. Since the commit notification from the transaction master 202 to client 170 and the one from transaction master 202 to the transaction slave 203 may be triggered simultaneously, the "false visibility" or "false lock conflict" may be alleviated. In some implementations, the second commit phase may be done "lazily" and in bulk (by aggregating several transactions' request). However, to maintain last-CID for each transaction slave, the second commit phases may be processed in CID order at each transaction slave 203.

Figure 7:
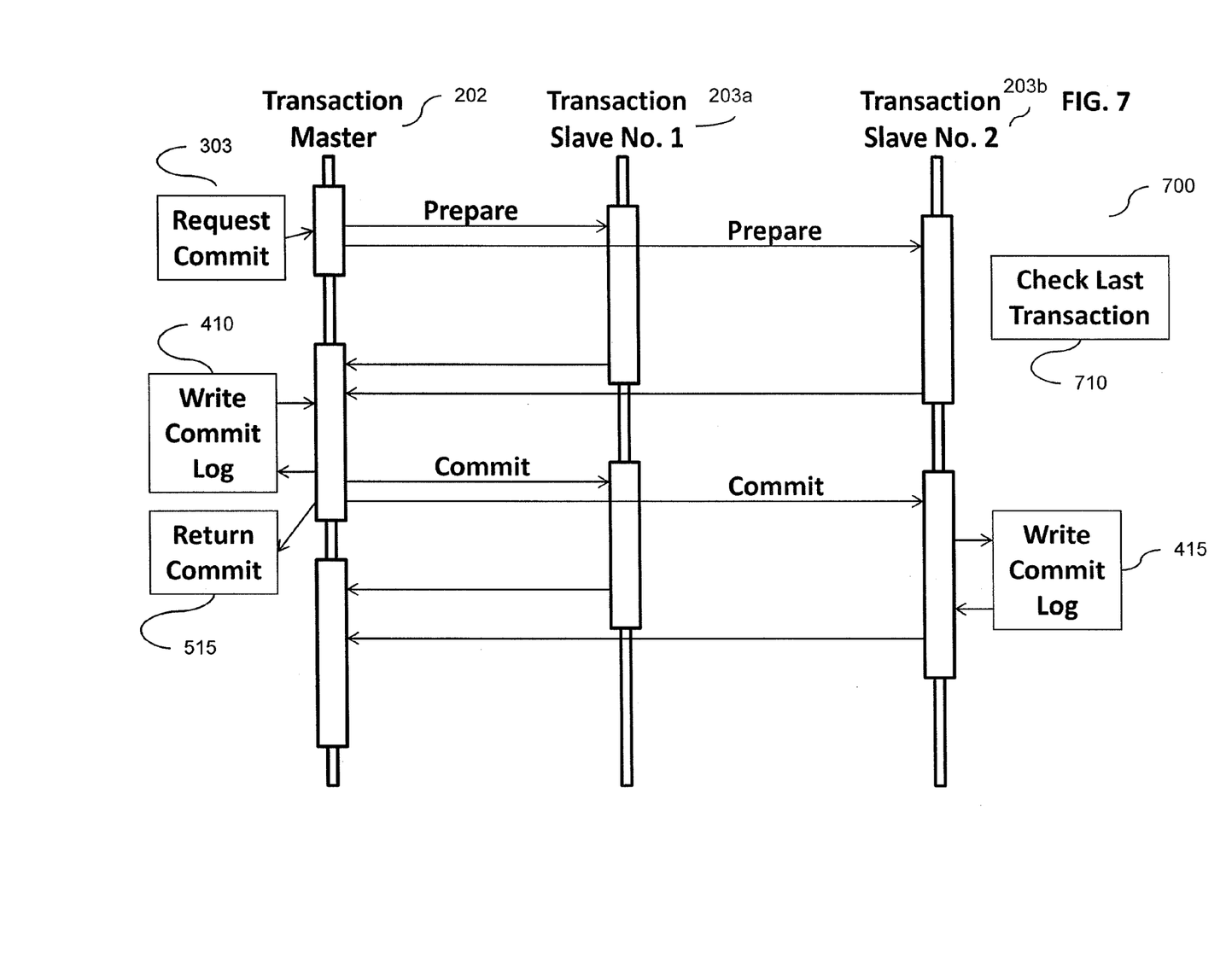
FIG. 7 illustrates an exemplary system for optimizing transaction management in distributed processing systems during a two-phase commit operation by skipping the writing of a prepare log, according to some implementations of the current subject matter.

FIG. 7 illustrates a process flow among components. The process may be used to optimize transaction management. In some respects, the procedure 700 may be similar to the procedure 400. However, during the procedure 700, in addition to returning an early acknowledgement of a commit transaction, write prepare log entries are not written. Instead, a transaction's last log sequence number ("LSN") is checked 710.

LSN is a monotonically increasing number used for log entry ID and offset within a log file. Higher-LSN log entry may be a later-generated log entry. This operation may allow for removal of additional log I/O that writes the prepare-commit log entry.

In a typical two-phase commit operation, the prepare-commit log entry may be used to ensure that the transaction's previous update logs are written to disk and to identify in-doubt transactions at the recovery time. Ensuring that the transaction's previous update logs are written to disk may be done without writing any additional log entries. Instead, it may be done by comparing a transaction-last-LSN with a log-disk-last-LSN (i.e., a last LSN stored on the disk). If the log-disk-last-LSN is larger than the transaction-last-LSN, the transaction's update logs may be already flushed to disk. If the prepare-commit log entry is not written, all recovery-time uncommitted-transactions may be handled as "in-doubt" transactions. Whether committed may be decided by asking to the transaction master 202. Thus, the size of in-doubt transaction list may increase but with less run-time overhead.

Figure 8:
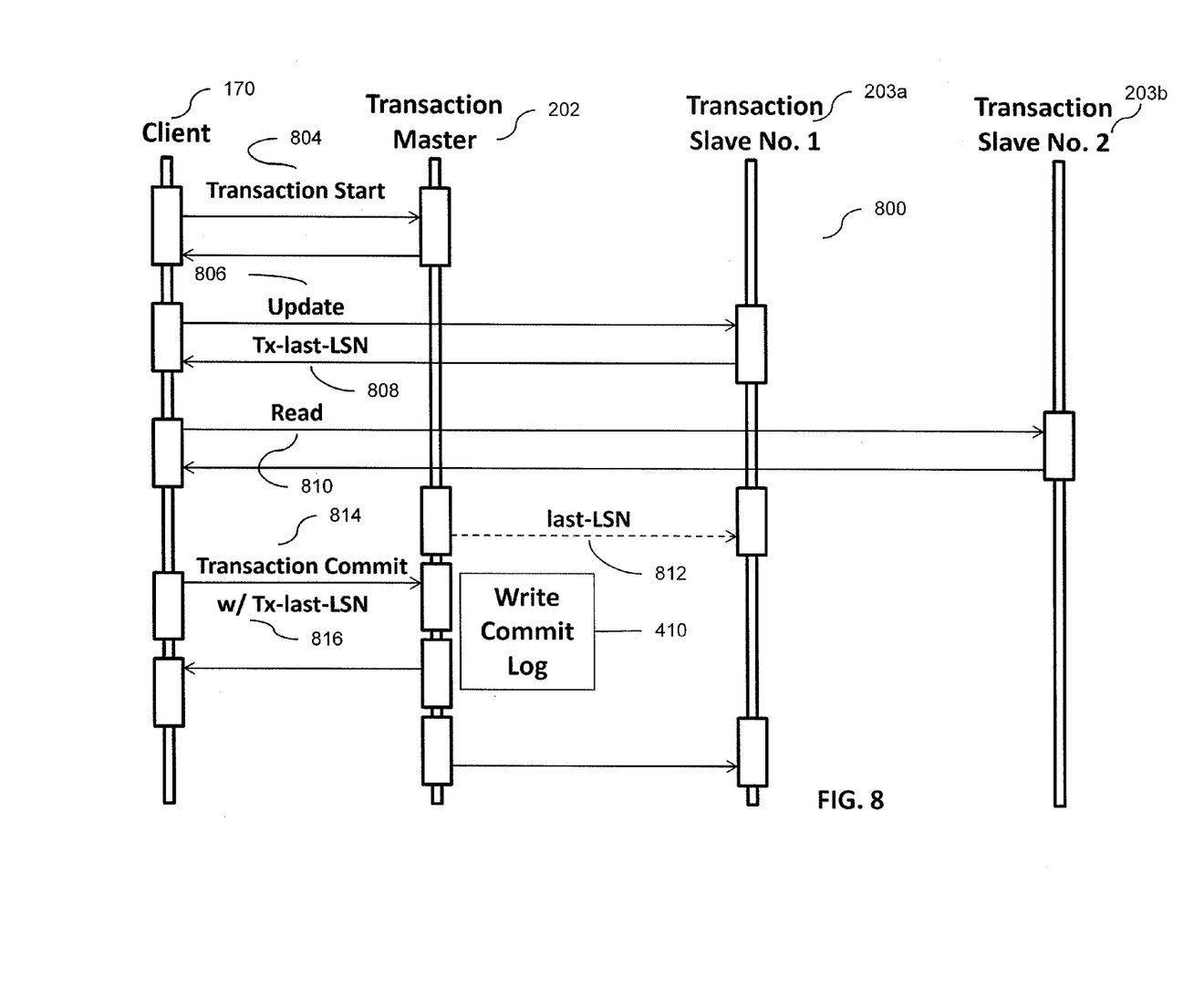
FIG. 8 illustrates an exemplary system for optimizing transaction management in distributed processing systems during a two-phase commit operation by skipping a first commit phase, according to some implementations of the current subject matter.

FIG. 8 illustrates another exemplary procedure 800 for optimizing transaction management, according to some implementations of the current subject matter. During the operation 800, the first commit phase of the two-phase commit procedure may be omitted. The first commit phase may be skipped selectively or at all times. The operation 800 proceeds between the client 170 that initiates transaction 804, transaction manager 202, and transaction slaves 203 (a, b). Even though the prepare-commit log entry might not be mandatory, it may be important to determine whether all the transaction's previous update logs are flushed to disk. However, in some cases, this condition is already met before starting the first commit phase and hence, the first phase may not be necessary.

As shown in FIG. 8, on every update operation 806, the transaction-last-LSN 808 may be returned to the client 170. The client 170 may attach the up-to-date transaction-last-LSN 814 when it requests transaction commit 816. The transaction master 202 may cache the transaction slave's last-LSN for each transaction slave 203(a, b), which is known to it. Then, if the transaction-last-LSN is less than the transaction slave's last-LSN of the target transaction slave (at 812), the transaction's update logs may be already flushed at the transaction slave, and thus, a prepare-commit phase may be skipped.

Figure 9:
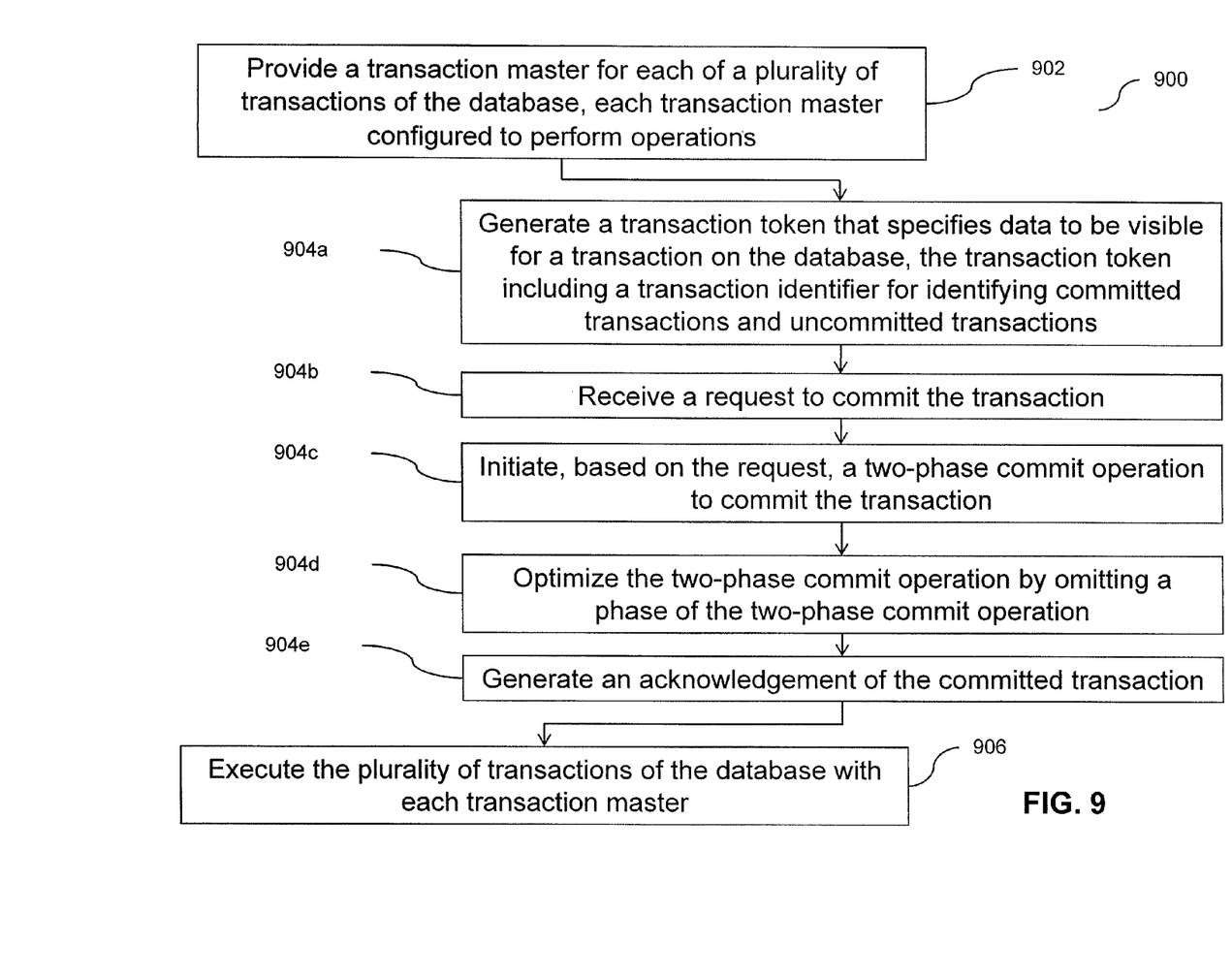
FIG. 9 illustrates an exemplary method, according to some implementations of the current subject matter.

FIG. 9 illustrates an exemplary method 900, according to some implementations of the current subject matter. The method 900 may be configured to manage distributed transactions in a database. At 902, a transaction master for each of a plurality of transactions of the database can be provided, wherein transaction master is configured to communication with at least one transaction slave to manage execution of a transaction in the plurality of transactions. The transaction manager may be configured to perform the following operations. The transaction master may generate a transaction token that specifies data to be visible for a transaction on the database, the transaction token including a transaction identifier for identifying committed transactions and uncommitted transactions, at 904a. At 904b, the transaction master receives a request to commit the transaction. Based on the request, the transaction master initiates a two-phase commit operation to commit the transaction, wherein the two-phase commit operation includes preparing for committing the transaction and writing a committed transaction to a memory, at 904c. At 904d, the transaction master may optimize the two-phase commit operation by omitting a phase of the two-phase commit operation. At 904e, an acknowledgment of the committed transaction may be generated by the transaction master. At 906, the plurality of transactions of the database with each transaction manager may be executed.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed implementations may be implemented in various environments. Such environments and related applications may be specially constructed for performing the various processes and operations according to the disclosed implementations or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed implementations, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

As used herein, the term "user" may refer to any entity including a person or a computer.

Although ordinal numbers such as first, second, and the like can, in some situations, relate to an order; as used in this document ordinal numbers do not necessarily imply an order. For example, ordinal numbers may be merely used to distinguish one item from another. For example, to distinguish a first event from a second event, but need not imply any chronological ordering or a fixed reference system (such that a first event in one paragraph of the description may be different from a first event in another paragraph of the description).

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description makes references to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A computer-implemented method, the method comprising:
    providing a transaction master for each of a plurality of transactions of a database, wherein each transaction master is configured to communicate with at least one transaction slave to manage execution of a transaction in the plurality of transactions, each transaction master configured to perform operations comprising:
        receiving a request to commit the transaction;
        initiating, based on the request, a two-phase commit operation to commit the transaction, wherein the two-phase commit operation comprises preparing for committing the transaction and writing a committed transaction to a memory;
        optimizing the two-phase commit operation by omitting the preparing for committing the transaction; and
        generating an acknowledgement of the committed transaction,
        wherein the omitting the preparing for committing the transaction further comprises:
            receiving a log sequence number corresponding to the transaction together with the request to commit the transaction;
            determining, at the transaction master, a stored log sequence number corresponding to the at least one transaction slave;
            comparing the received log sequence number and the stored log sequence number; and
            determining, based on the comparing, whether to omit the preparing for committing the transaction.

2. The computer-implemented method according to claim 1, wherein the generating the acknowledgement comprises generating an early acknowledgement of the committed transaction.

3. The computer-implemented method according to claim 2, wherein the early acknowledgement of the committed transaction is generated together with the writing of the committed transaction to the memory.

4. The computer-implemented method according to claim 1, wherein each transaction master is configured to perform operations further comprising generating a transaction token to specify data to be visible for a transaction on the database, the transaction token including a transaction identifier for identifying whether the transaction is a committed transaction or an uncommitted transaction.

5. The computer-implemented method according to claim 4, further comprising
    obtaining the transaction token corresponding to the committed transaction based on a commit identifier corresponding to the transaction.

6. The computer-implemented method according to claim 1, wherein each transaction master is configured to perform operations further comprising executing the plurality of transactions of the database.

7. A computer program product comprising a non-transitory machine-readable medium storing instructions that, when executed by at least one programmable processor, causes the at least one programmable processor to perform operations comprising:
    providing a transaction master for each of a plurality of transactions of a database, wherein each transaction master is configured to communicate with at least one transaction slave to manage execution of a transaction in the plurality of transactions, each transaction master configured to perform operations comprising:
        receiving a request to commit the transaction;
        initiating, based on the request, a two-phase commit operation to commit the transaction, wherein the two-phase commit operation comprises preparing for committing the transaction and writing a committed transaction to a memory;
        optimizing the two-phase commit operation by omitting the preparing for committing the transaction; and
        generating an acknowledgement of the committed transaction,
        wherein the omitting the preparing for committing the transaction further comprises
            receiving a log sequence number corresponding to the transaction together with the request to commit the transaction;
            determining, at the transaction master, a stored log sequence number corresponding to the at least one transaction slave;
            comparing the received log sequence number and the stored log sequence number; and
            determining, based on the comparing, whether to omit the preparing for committing the transaction.

8. The computer program product according to claim 7, wherein the generating the acknowledgement comprises
generating an early acknowledgement of the committed transaction.

9. The computer program product according to claim 8, wherein the early acknowledgement of the committed transaction is generated together with the writing of the committed transaction to the memory.

10. The computer program product according to claim 7, wherein each transaction master is configured to perform operations further comprising generating a transaction token to specify data to be visible for a transaction on the database, the transaction token including a transaction identifier for identifying whether the transaction is a committed transaction or an uncommitted transaction.

11. The computer program product according to claim 7, wherein each transaction master is configured to perform operations further comprising executing the plurality of transactions of the database.

12. A system comprising:
at least one programmable processor; and
a non-transitory machine-readable medium storing instructions that, when executed by the at least one programmable processor, causes the at least one programmable processor to perform operations comprising:
providing a transaction master for each of a plurality of transactions of a database, wherein each transaction master is configured to communicate with at least one transaction slave to manage execution of a transaction in the plurality of transactions, each transaction master configured to perform operations comprising:
receiving a request to commit the transaction;
initiating, based on the request, a two-phase commit operation to commit the transaction, wherein the two-phase commit operation comprises preparing for committing the transaction and writing a committed transaction to a memory;
optimizing the two-phase commit operation by omitting the preparing for committing the transaction; and
generating an acknowledgement of the committed transaction,
wherein the omitting the preparing for committing the transaction further comprises
receiving a log sequence number corresponding to the transaction together with the request to commit the transaction;
determining, at the transaction master, a stored log sequence number corresponding to the at least one transaction slave;
comparing the received log sequence number and the stored log sequence number; and
determining, based on the comparing, whether to omit the preparing for committing the transaction.

13. The system according to claim 12, wherein the generating the acknowledgement comprises
generating an early acknowledgement of the committed transaction.

14. The system according to claim 13, wherein the early acknowledgement of the committed transaction is generated together with the writing of the committed transaction to the memory.

15. The system according to claim 12, wherein each transaction master is configured to perform operations further comprising generating a transaction token to specify data to be visible for a transaction on the database, the transaction token including a transaction identifier for identifying whether the transaction is a committed transaction or an uncommitted transaction.

16. The system according to claim 12, wherein each transaction master is configured to perform operations further comprising executing the plurality of transactions of the database.

* * * * *

UNITED STATES PATENT AND TRADEMARK OFFICE
CERTIFICATE OF CORRECTION

PATENT NO. : 8,442,962 B2
APPLICATION NO. : 12/980178
DATED : May 14, 2013
INVENTOR(S) : Lee et al.

It is certified that error appears in the above-identified patent and that said Letters Patent is hereby corrected as shown below:

In the Claims:

Claim 1, Column 12, lines 9-10, the portion reading "determining based the on comparing, whether to omit the preparing for committing the transaction" should read --omitting the preparing for committing the transaction when the received log sequence number is less than the stored log sequence number--.

Claim 7, Column 12, lines 66-67, the portion reading "determining based the on comparing, whether to omit the preparing for committing the transaction" should read --omitting the preparing for committing the transaction when the received log sequence number is less than the stored log sequence number--.

Claim 12, Column 14, lines 15-16, the portion reading "determining based the on comparing, whether to omit the preparing for committing the transaction" should read --omitting the preparing for committing the transaction when the received log sequence number is less than the stored log sequence number--.

Signed and Sealed this
Tenth Day of June, 2014

Michelle K. Lee
*Deputy Director of the United States Patent and Trademark Office*